United States Patent [19]

Baden

[11] 4,127,283
[45] Nov. 28, 1978

[54] MULTIPLE DRILL HITCH ASSEMBLY

[75] Inventor: Richard E. Baden, Spokane, Wash.

[73] Assignee: Agricot Company, Inc., Spokane, Wash.

[21] Appl. No.: 769,905

[22] Filed: Feb. 18, 1977

[51] Int. Cl.² ............................................. B60D 1/14
[52] U.S. Cl. ............................... 280/411 R; 172/240; 172/310; 172/625; 172/689
[58] Field of Search ........... 280/411 R, 411 A, 411 C, 280/412, 413, 476 R; 172/625, 310, 313, 314, 689, 669, 240; 111/53–58

[56] References Cited

U.S. PATENT DOCUMENTS

| 13,257 | 7/1855 | Gourley | 172/689 X |
|---|---|---|---|
| 2,773,703 | 12/1956 | Ferguson et al. | 280/476 R |
| 3,058,280 | 10/1962 | Lewis | 280/413 X |
| 3,334,916 | 8/1967 | Tibbals | 280/476 A |
| 3,700,040 | 10/1972 | Sosalla | 280/411 R |
| 3,901,327 | 8/1975 | Mitchell | 172/625 X |
| 3,910,605 | 10/1975 | De Wayne | 172/625 X |

Primary Examiner—John A. Pekar
Attorney, Agent, or Firm—Wells, St. John & Roberts

[57] ABSTRACT

A plurality of conventional grain drills or other agricultural implements are arranged in a staggered transverse pattern within individual peripheral frameworks. The frameworks are pivoted to one another about longitudinal axes. They are adjustably supported for rolling ground engagement by hydraulically controlled wheel assemblies. Separate hitch tongues are provided at the center of the arrangement for field use, and at one end of the arrangment for travel purposes. The wheels on the framework are adapted to assist in supporting the conventional implements during field use, and are arranged transversely to support the implements in an elevated condition during road travel. A provision is made for use of a single implement with minimum disruption of hitch combination.

4 Claims, 7 Drawing Figures

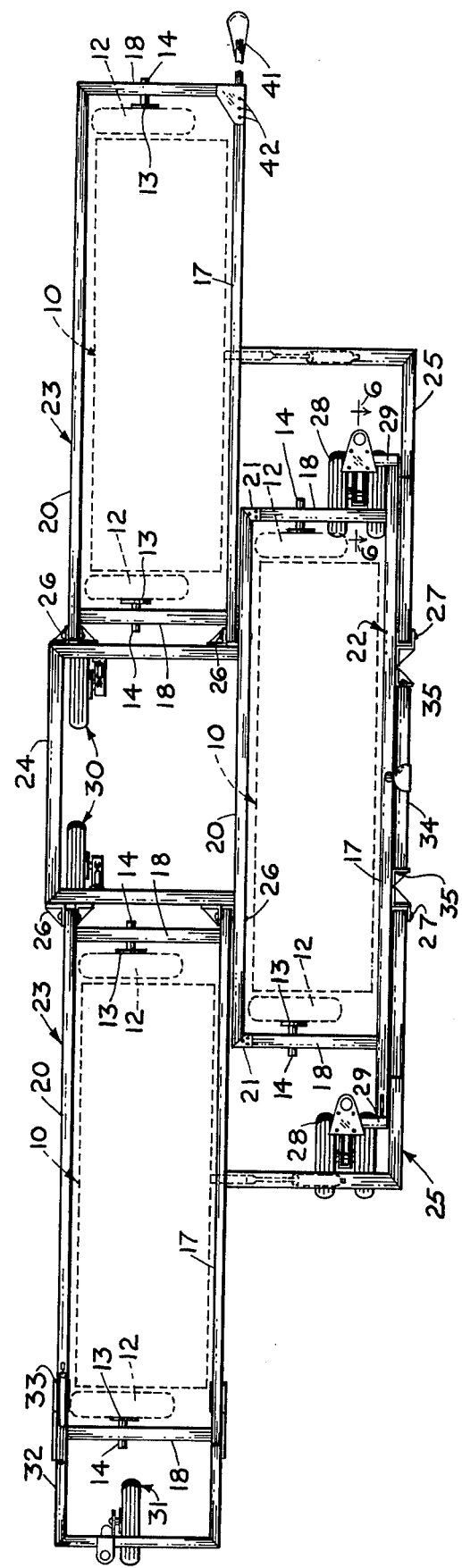

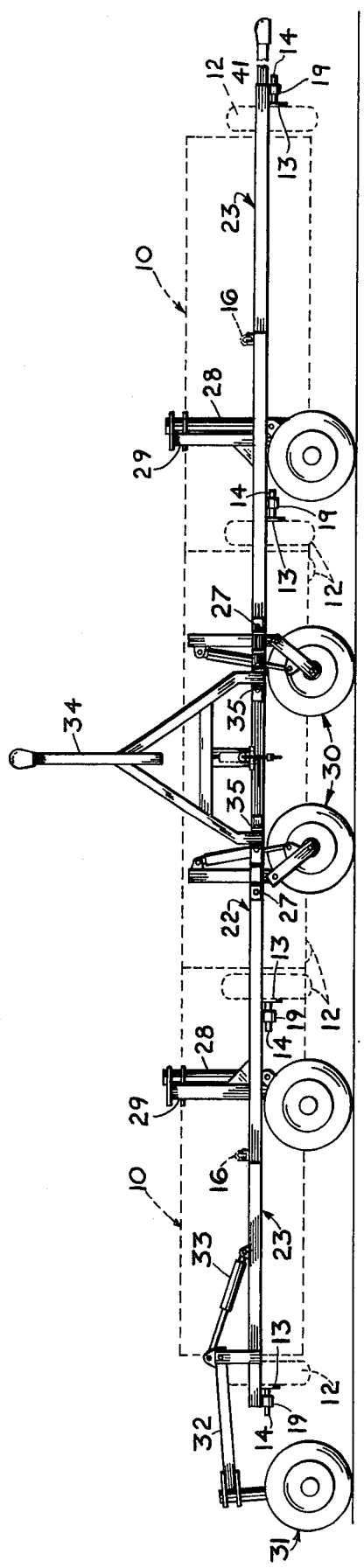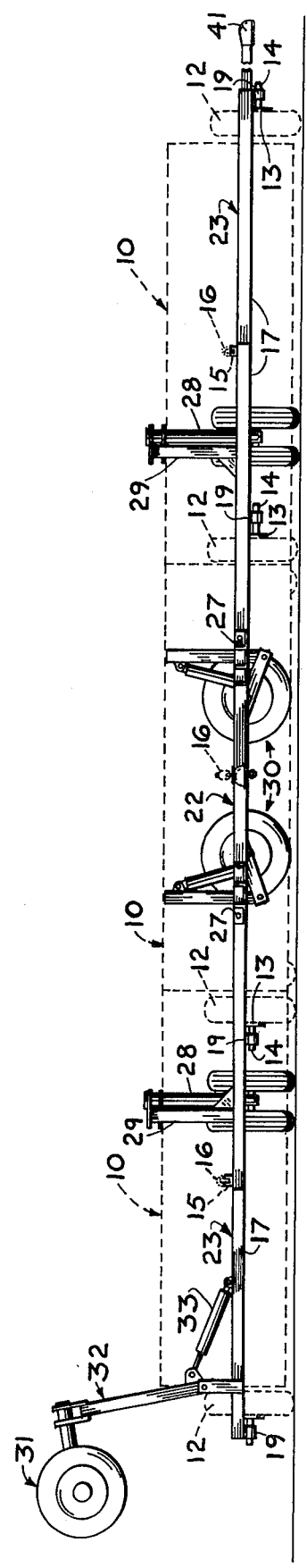

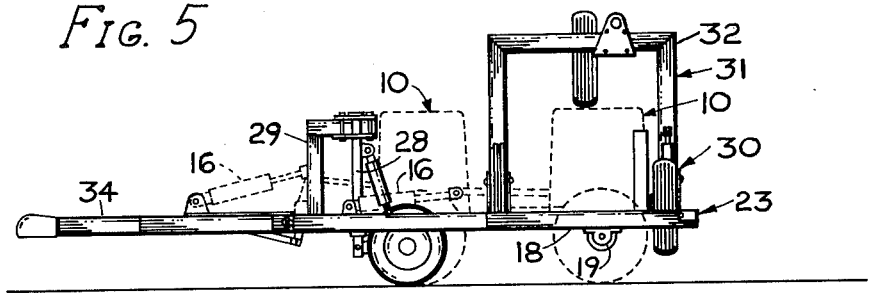
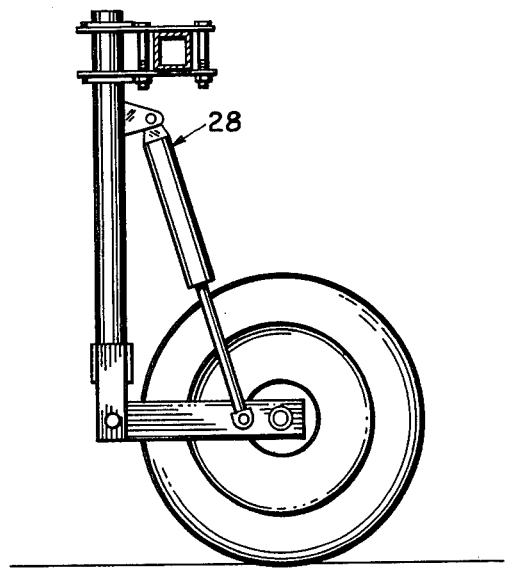
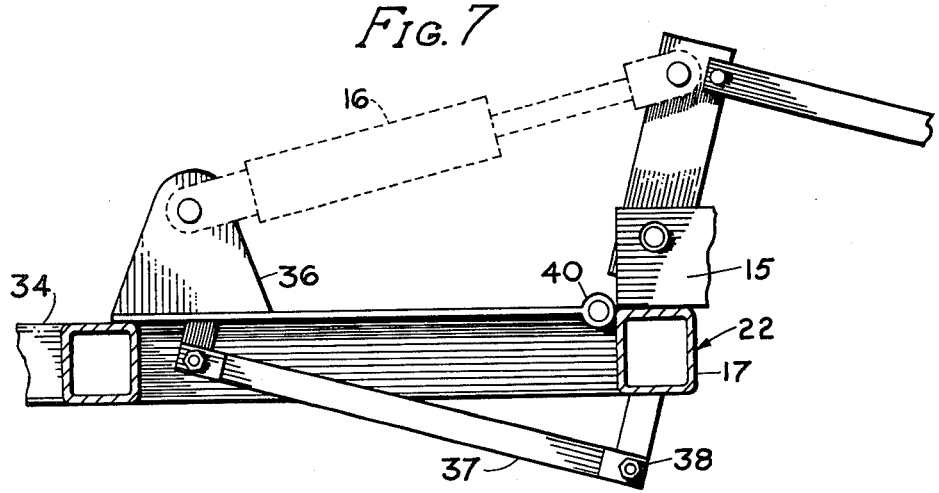

MULTIPLE DRILL HITCH ASSEMBLY

BACKGROUND OF THE INVENTION

This invention basically relates to a hitch frame permitting field use of a plurality of conventional seed drills. Seed drills come in various widths, depending on the number of openers in a particular drill unit. However, there is a practical limit to the normal drill width, dictated by the need for flexibility to accommodate varying ground contour in fields that are not absolutely flat. As tractors have become increasingly larger and have correspondingly increased available pulling power, farmers have a greater desire for gang hitches capable of pulling two to five drills across a field simultaneously. This results in substantial time savings and increased labor efficiency. However, such wide hitches must also be designed to permit lengthwise transport of the hitch assembly along roads.

Many farmers also desire greater drill flexibility, particularly in view of the newer practices relating to "zero till" or "no till" planting. These farming practices require greater penetration by the drill, and many conventional drills simply do not have sufficient weight to penetrate soil which has not previously been prepared by tilling.

The present hitch has been designed to accommodate conventional drills while requiring no modification of the drill assembly itself. It has been designed to permit field use of one, two, three or five drills in side by side position, with no gap between the openers of adjacent drills other than the normal opener spacing. It provides sufficient flexibility between adjacent drills to allow them to accommodate to ground contour. It permits the drills to be operated in their normal fashion, supported by their conventional end wheel assemblies. For transport purposes, transverse wheels are provided on surrounding frameworks, capable of lifting the drills to disengage the end wheels from ground contact. Endwise transport is therefore available without modification of the drill units themselves. The units are supported entirely by stub shafts mounted to the end wheel assemblies. The hitch assembly is readily converted from a field mode to a travel mode. It provides substantial additional weight to the drill assembly to better enable them to be used in no till farm practices. It can be readily modified to permit use of a single drill when this is desired in a small section, along borders, etc.

SUMMARY OF THE INVENTION

The hitch assembly in its basic modular concept comprises a peripheral rigid framework which is adapted to extend across the front of the drill or other similar implement and which has integral rearward extensions adapted to be arranged outwardly adjacent the respective end wheel assemblies on the implement frame. Bearings on the framework extensions are adapted to rotatably support stub shafts extending coaxially outward from the respective implement and wheel assemblies. This hitch framework can then be used to pull the drill or implement through a field.

In a multiple hitch assembly, a plurality of peripheral rigid frameworks each surround a single drill or implement and support it by means of the bearings and stub shafts. The rigid frameworks are staggered side by side in transversely overlapping positions parallel to one another. Each adjacent pair of rigid frameworks are hinged to one another about a horizontal longitudinal axis parallel to the field direction of movement. A first tongue is mounted to the center of the assembly and extends forwardly therefrom when in a field draft position. A second tongue is mounted at one end of the assembly to an outboard rigid framework and extends transversely outward therefrom when in a travel or draft position. Elevationally adjustable wheel units are mounted to the individual rigid frameworks at longitudinally staggered positions and are capable of lifting the rigid frameworks and implements relative to the ground. The wheel assemblies are selectively raised or lowered to either permit field use of the drills or implements by normal ground contact of their end wheels, or to raise the drills and end wheels from ground contact in preparation for endwise travel.

A first object of this invention is to provide an effective hitch frame capable of transmitting substantial pulling loads to multiple drill units or similar types of agricultural implements without requiring structural or operational modification of the drills or implements.

Another object of this invention is to provide a relatively simple structural hitch assembly which can readily permit the user to use a single drill or implement when use of a multiple arrangement is not practical.

Another object of the invention is to provide an effective drill hitch assembly which can be readily converted from a field draft mode to a travel mode so that extremely wide field units can be pulled endwise for travel purposes.

Another object of the invention is to provide a hitch with readily adjustable means for varying the amount of hitch weight that is carried by the drill or implement and wheel assemblies, permitting the user to readily vary the weight or penetration characteristics of the drill or implement.

These and further objects will be evident from the following disclosure and the accompanying drawings.

BRIEF DESCRIPTION OF THE DRAWINGS

FIG. 2 is a top view similar to FIG. 1, showing the hitch assembly in a travel mode;

FIG. 3 is a front view of the hitch assembly as seen in FIG. 2;

FIG. 4 is a front view of the hitch assembly as seen in FIG. 1;

FIG. 5 is an end view as seen from the right in FIG. 1;

FIG. 6 is an enlarged sectional view taken along line 6—6 in FIG. 2; and

FIG. 7 is an enlarged sectional view taken along line 7—7 in FIG. 1.

DESCRIPTION OF THE PREFERRED EMBODIMENT

Figure 1:
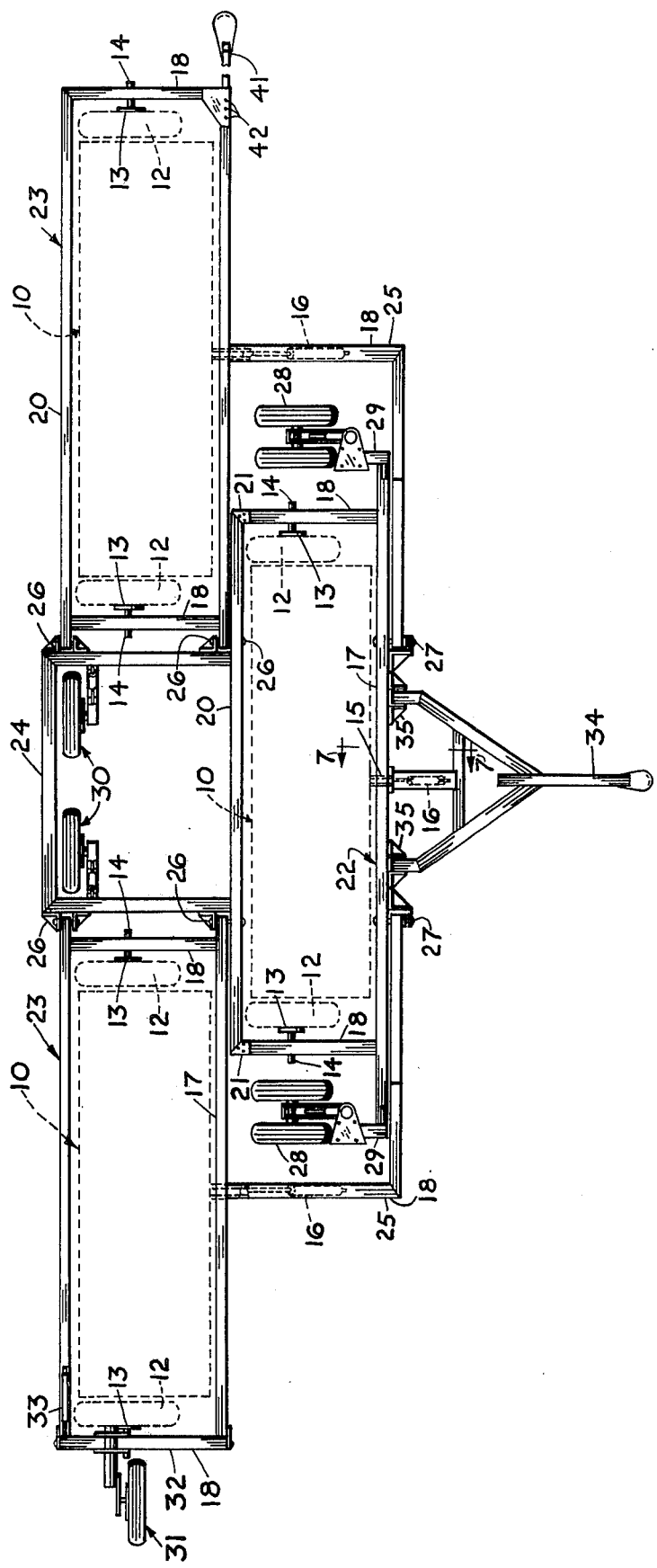
FIG. 1 is a top view of the multiple hitch assembly, the conventional drill units being illustrated in dashed lines.

The drawings illustrate an embodiment of the invention designed for pulling three conventional seed drills of the type used for sowing grain in agriculture fields. The details of such drills as are commercially available are well known and not particularly pertinent to an understanding of this invention. A drill basically utilizes a series of transversely spaced openers which deposit seeds at the desired field depth. The seeds are fed from a storage box on the drill by a mechanism usually operated by rotation of supporting end wheels on the drill. The openers can be raised or lowered relative to the end wheels to selectively render them inoperative or to control the depth of planting.

To adapt a conventional drill to the present hitch, it is necessary only to remove the towing tongue that extends to the front of the drill and the running board that extends along the back of the drill. The present hitch assembly includes a rear frame member capable of serving in place of the conventional running board to provide access to the grain boxes of the drill.

While reference will be made herein to the utilization of the hitch assembly with respect to grain drills, it is to be understood that other types of drills and other similar farm implements can be adapted to the hitch as well. The hitch is not to be limited in its application to grain drills only.

In the drawings, the outline of a conventional drill is generally shown at 10. The structural arrangement illustrated in the drawings is designed for use with three drills 10. As will be discussed below, five drills can be incorporated into the hitch assembly when even greater width is desired. It can be designed for two or more drills in a staggered overlapping pattern. Furthermore, the complete arrangement can be readily modified to enable one to use a single drill carried by the hitch assembly when a small width of land must be planted along a border or in other restricted areas.

Each drill 10 comprises an elongated transverse frame supported by end wheels 12. Most drills also include a lift cylinder 16 which raises or lowers the drill for field use. The central drill hitch is shown at 15 (FIG. 7). In a conventional drill, the pulling tongue is connected to the hitch 15 and supports the outer end of the lift cylinder 16.

To prepare a conventional drill for use with the present hitch assembly, one must remove the usual tongue (not shown) by disconnecting the drill hitch 15 and the outer end of the lift cylinder 16. The only further modification required with respect to the usual drill components is the addition of a stub shaft 14 extending outward from a wheel adapter or flange 13 secured coaxially to the outer hub of each end wheel 12. The adapter or flange 13 is mounted in place by the conventional lugs that mount the end wheels 12 to their hubs.

The hitch assembly disclosed herein is designed on a modular concept. While the modules are essentially the same, there are variations in their structure and support features. In the three unit assembly shown in the drawings, the center unit is designated generally by the reference numeral 22 and the two outboard units are designated generally by the reference numeral 23. The outboard units 23 are identical in most respects, but are mirror images of one another and symmetrical about the longitudinal center line of the hitch assembly.

As used herein, the term "longitudinal" will refer to a direction parallel to the intended field direction of movement of the hitch assembly during agricultural use. The term "transverse" shall refer to the perpendicular direction across the width of the hitch assembly, perpendicular to its field direction of movement and parallel to its travel direction of movement. Transverse movement will therefore be synonymous with "endwise" movement of the hitch assembly.

Each drill 10 is surrounded within the hitch assembly by a peripheral horizontal frame. Each frame includes a transverse front member 17 and a transverse rear member 20. Extending rearwardly from the respective ends of the front member 17 are two perpendicular connecting end members 18. End members 18 are located transversely outward and adjacent to the respective end wheels 12 of the drill enclosed thereby. Each end member 18 carries a bearing 19 which rotatably journals the stub shaft 14 extending outwardly from the adjacent end wheel 12. The bearings 19 and stub shafts 14 constitute the principal structural connection between the hitch assembly and each drill 10. The hitch assembly therefore supports the drills 10 through the axle conventionally provided for that purpose.

The peripheral frames of the center unit 22 and outboard units 23 are basically identical. The frames are generally constructed with welded joints for strength. However, in the case of the center unit 22, the joints between the rear ends of the end members 18 and the rear member 20 are bolted as shown in FIG. 1 and FIG. 2 by the reference numeral 21. This bolted connection is provided for ease in modifying the apparatus for single drill use.

At the center rear of unit 22 is a rectangular extension frame 24 which has a depth from front to rear basically similar to the longitudinal depth of each peripheral frame. The rear extension frame 24 serves as structural support for the outboard units 23 and for travel wheel units discussed below.

Each of the outboard units 23 has rigid front braces 25 extending forwardly therefrom and overlapping a portion of the front member 17 in the center unit 22 of the assembly. The inner end of each outboard unit 23 is hinged to the center unit 22 about a pair of coaxial hinge connections 26 at the side of the extension frame 24 and a coaxial front hinge 27 at the inner end of each front brace 25. The front hinge 27 includes a releasable hinge pin which can be pulled to readily detach the braces 25 when desired.

The hitch assembly is supported by a pair of vertically adjustable swivel wheel units 28 mounted to the center frame 22. They pivot freely about vertical axes on posts 29 integral to each end of frame 22. The center rear portion of the hitch assembly is selectively supported by a pair of retractable transverse wheel units 30 movably mounted within the rear extension frame 24 for vertical movement relative to the frame. While wheel units 28 and 30 are primarily provided for travel transport purposes, the swivel units 28 are used to carry part of the hitch weight during field usage as well. The transverse units 30 are retracted during field use and lowered for use during travel only.

To provide additional support at the rear end of the hitch assembly when traveling endwise, an outboard wheel unit 31 is provided on a rigid frame 32 hinged to the outer end of one outboard unit 23 (to the left in FIGS. 1 and 2). A cylinder assembly 33 is connected between frame 32 and the peripheral frame of the outboard unit 23. It selectively moves the frame 32 about its hinge axis between an upright storage position for field use and a lower horizontal position with the outboard wheel unit 31 then in ground contact. The wheel unit 31 is free to swivel about an upright axis on the frame 32.

For use behind a tractor, a front tongue 34 is provided at the center of unit 22. The tongue 34 extends forwardly during field use. It is hinged to the front member 17 of the central frame to permit it to be raised to an upright storage position for travel purposes. Also aligned along the longitudinal center line of the hitch assembly is a rigid cylinder support 36 held in place by a triangular lower brace 37. The rear end of the cylinder support 36 is hinged at 40 to the front member 17 of the center frame. A releasable pin 38 selectively connects the triangular brace 37 to a bracket rigidly mounted beneath the front member 17. The cylinder support 36 carries an ear for the necessary connection to the outer end of the lift cylinder 16 in the center drill 10.

The end of the hitch assembly opposite to the outboard wheel unit 31 is provided with a retractable outboard tongue 41. Tongue 41 is releasably located by means of tongue pins 42 which extend through the front member 17 of the outboard unit 23 shown to the right in FIGS. 1 and 2. The tongue 41 can be extended transversely outward from the frame or retracted by disengagement and subsequent interconnection of the pins 42 as desired.

When used in the field for seeding purposes or when used to support other analogous implements, the hitch basically provides proper pulling power and control to the several conventional implement units. As noted above, the hitch does not require any structural modification of the drill or other implement. The drills 10 shown in dashed lines for illustration purposes are connected to the hitch assembly only by the rotatable mounting of the stub shafts 14 in the bearings 19, and by a bolted connection between the drill hitch 15 and each front member 17 of the frame surrounding the respective drill. The connection between the drill hitch 15 and the front member 17 fixes the upright angular position of the drill about its wheel axis. It also locates the drill in a stationary position for proper operation of the lift cylinder 16.

With the wheel units 30 retracted and the hinged frame 32 in its upright position, one can adjust the elevation of the front swivel wheel units 28 by operation of their hydraulic cylinders to vary the distribution of weight between the wheel units 28 and the end wheels 12 of the drills. The several drills can then be pulled in unison by a single tractor. The hinged connections 26 and 27 enable the outboard units 23 to pivot with respect to the center unit 22 as necessary to adapt to ground contour. It is to be noted that the drills overlap one another in a staggered parallel relationship, which can be located so as to properly space the outboard openers so that no undue spacing results between the adjacent crop rows planted during traverse of a field.

When used in the field, the hitch assembly is used primarily to direct pulling power to the drill hitches 15. The drills are carried by the rolling ground engagement of the conventional end wheels 12, which also operate the feed mechanisms for the individual drills in the conventional fashion. The lift cylinders 16 can be utilized to raise and lower any particular drill, again operating in a conventional manner. However, the extra weight of the hitch assembly is particularly useful, since it is applied through the stub shafts 14 to the axle of each drill 10 and provides additional field weight and penetration for the drill openers or other implements. In the case of a drill, this is particularly important when seeding a field without prior tillage. The added weight of the hitch assembly makes possible "no till" seeding of fields which might not otherwise be penetrated by a conventional drill.

To prepare the hitch assembly for travel in an endwise direction along a road, one must release the connection between the outer end of the lift cylinder 16 at the center unit 22 in preparation for pivotal movement of the front tongue 34. The pin 38 is also released to disconnect the lower brace 37 and thereby permit the cylinder support 36 to be folded upwardly to reduce the longitudinal "width" of the hitch assembly when moving transversely or endwise. The brace 37 is held in an upright position by the upright tongue 34, which swings over-center and remains in an upright position until pulled downwardly about the hinge connections at 35.

The drills 10 are raised by lowering the wheel units 28 and 30. This is accomplished simultaneously with pivotal movement of the hinged frame 32, which brings the outboard wheel unit 31 into ground engagement. The five wheel units are lowered by individual hydraulic cylinders a distance sufficient to provide clearance between the ground and the end wheels 12 of the several drills. The hitch assembly is then in condition for endwise travel by connection of the extended outboard tongue 41 to a truck or other vehicle (not shown).

As is evident from the above disclosure, the hitch assembly can be readily converted from field use to travel use, requiring no basic modification in the connections and mountings between the conventional drills and the hitch frameworks that surround them.

In addition, one can readily utilize a single drill when this is desirable because of width restrictions in a particular field area. This is accomplished by pulling the front pins 27 that hinge the braces 25 to the central front frame member 17 and by detaching the bolted connections 21 that join the rear corners of the central peripheral frame. One can then use the front tongue 34 and the front member 17 and connected end members 18 to pull the central drill, leaving the outboard drills in the hitch assembly without further modifications. While this does not provide for endwise travel of the central drill unit while detached from the outboard drill units, it does permit normal field use of the drill without complete dismemberment of the hitch assembly mounted to it.

The assembly can be readily extended for five drills, the two additional drills being mounted in an overlapping relationship either at the front or rear of the illustrated outboard units 23. Again, the additional drill units (not shown) would preferably be connected by longitudinal hinge connections to enable them to move relative to one another so as to adapt to varying ground contours. If extended for five drills, the outboard tongue 41 would be relocated to the outer peripheral frame at one end of the unit and the outboard wheel unit 31 would be relocated to the outer drill unit at the remaining end of the assembly.

Other modifications might be made in the illustrated structure without deviating from the basic structural arrangement described herein. For these reasons, only the following claims are intended to define the scope of the invention.

Having thus described my invention, I claim:

1. A hitch assembly for farm implements of the type that are transversely elongated relative to their intended direction of forward field travel and which include an implement frame supported at its respective transverse ends by coaxial end wheel assemblies, each end wheel assembly being provided with an outwardly extended coaxial shaft;

said hitch assembly comprising:
a peripheral rigid framework adapted to extend across the front of the implement frame and having integral rearward extensions adapted to be located outwardly adjacent the respective end wheel assemblies of the implement frames;
and bearing means on said extensions adapted to receive and rotatably support the shafts that extend outwardly from the end wheel assemblies at the respective ends of the implement frame;

a first tongue hinged to the rigid framework about a transverse horizontal axis, said first tongue being movable about said transverse horizontal axis between an upright storage position and a forwardly extended field draft position;

a second tongue mounted to the rigid framework and extending transversely outward therefrom;

and retractable wheel means mounted to said framework for elevational adjustment of the framework position relative to the suporting surface beneath it;

the wheel means being aligned transversely across the framework.

2. A hitch assembly for farm implements of the type that are transversely elongated relative to their intended direction of forward field travel and which include an implement frame supported at its respective transverse ends by coaxial end wheel assemblies, each end wheel assembly being provided with an outwardly extended coaxial shaft;

said hitch assembly comprising:

a plurality of peripheral rigid frameworks equal in number to the number of farm implements;

each framework being adapted to surround the front, ends and rear of one implement;

each framework including a pair of end extensions adapted to be located outwardly adjacent the respective wheel assemblies at the transverse ends of the implement frame;

bearing means on said extensions adapted to rotatably support the shafts that extend outwardly from the end wheel assemblies at the respective transverse ends of the implement frame;

the rigid frameworks being arranged in transversely overlapping positions parallel to one another, each adjacent pair of frameworks being hinged to one another about a horizontal axis parallel to their intended direction of forward field travel;

a first tongue mounted on a central one of said frameworks for extension forwardly therefrom when in a field draft position;

a second tongue mounted to an outboard one of said frameworks for extension transversely outward therefrom when in a travel draft position;

and elevationally adjustable wheel means mounted to the individual frameworks for varying the elevation of the frameworks relative to the ground.

3. A hitch assembly as set out in claim 2 wherein the wheel means are movably mounted on the rigid frameworks for alignment of the wheel means in parallel transverse positions for travel purposes.

4. A hitch assembly as set out in claim 2 wherein the implement frames each have an implement hitch extending forwardly therefrom;

and means for fixing the forward end of each implement hitch to the framework surrounding that implement.

* * * * *